(12) United States Patent
Hofmann et al.

(10) Patent No.: US 7,211,914 B2
(45) Date of Patent: May 1, 2007

(54) ELECTRIC MOTOR HAVING A HIGH DEGREE OF PROTECTION AGAINST THE INGRESS OF FOREIGN PARTICLES AND MOISTURE

(75) Inventors: Walter Hofmann, Mulfingen (DE); Gunter Streng, Schrozberg (DE); Jochen Schwarz, Schöntal-Berlichingen (DE)

(73) Assignee: EBM-Papst Mulfingen GmbH & Co. KG, Bachmuhle (DE)

( * ) Notice: Subject to any disclaimer, the term of this patent is extended or adjusted under 35 U.S.C. 154(b) by 139 days.

(21) Appl. No.: 11/175,866

(22) Filed: Jul. 6, 2005

(65) Prior Publication Data
US 2006/0006094 A1    Jan. 12, 2006

(30) Foreign Application Priority Data
Jul. 6, 2004    (DE) ................. 20 2004 010 513 U

(51) Int. Cl.
*H02K 5/10*    (2006.01)
(52) U.S. Cl. ................ 310/88; 310/68 R; 310/71; 310/89; 310/85
(58) Field of Classification Search ............... 310/85, 310/88
See application file for complete search history.

(56) References Cited

U.S. PATENT DOCUMENTS

| | | | | |
|---|---|---|---|---|
| 3,631,275 A | * | 12/1971 | Conrad et al. ............. | 310/71 |
| 4,518,886 A | * | 5/1985 | Kaneyuki .................. | 310/71 |
| 5,668,422 A | * | 9/1997 | Deynet ..................... | 310/71 |
| 6,333,576 B1 | * | 12/2001 | Ishikawa et al. ............ | 310/85 |
| 6,483,213 B1 | * | 11/2002 | Hsu ......................... | 310/68 R |
| 6,661,134 B2 | * | 12/2003 | Sunaga et al. .............. | 310/64 |
| 6,707,185 B2 | * | 3/2004 | Akutsu et al. .............. | 310/71 |
| 6,753,629 B2 | * | 6/2004 | Doi et al. .................. | 310/68 D |
| 6,949,851 B2 | * | 9/2005 | Wysk et al. ................ | 310/89 |
| 6,987,336 B2 | * | 1/2006 | Streng et al. .............. | 310/51 |
| 2003/0213087 A1 | * | 11/2003 | Moein et al. .............. | 15/250.3 |

FOREIGN PATENT DOCUMENTS

| | | | |
|---|---|---|---|
| DE | 103 13 274 A | | 2/2004 |
| EP | 1 361 644 A2 | | 11/2003 |
| JP | 2004120995 A | * | 4/2004 |
| WO | WO 01/2807 A2 | | 4/2001 |

* cited by examiner

*Primary Examiner*—Burton Mullins
(74) *Attorney, Agent, or Firm*—Brinks Hofer Gilson & Lione

(57) ABSTRACT

The present invention relates to an electric motor having a high degree of protection against the ingress of foreign particles and moisture, in particular an electronically commutated external rotor DC motor, having a stator (1), having a rotor (2) and having an electronics housing (6) which extends transversely with respect to the motor shaft (3) and accommodates in its interior (4) a printed circuit board (5) having open-loop and closed-loop control electronics and commutation electronics. In this case, connection openings (6c) are located in a base (6b) of the electronics housing (6), connection elements (7), which connect the stator (1) and the printed circuit board (5) to one another, passing through the connection openings (6c), and a seal (8, 8a, 8c, 8e, 11, 12, 18, 24) seals at least the connection openings (6c) in the base (6b) of the electronics housing (6) through which the connection elements (7) pass. The seal (8, 8a, 8c, 8e, 11, 12, 18, 24) comprises a plate like partition wall (8) which is arranged on the base (6c) of the electronics housing (6) and serves the purpose, on the one hand, of physically sealing the electronics housing (6) and, on the other hand, of sealing the gaps in the electronics housing (6).

19 Claims, 8 Drawing Sheets

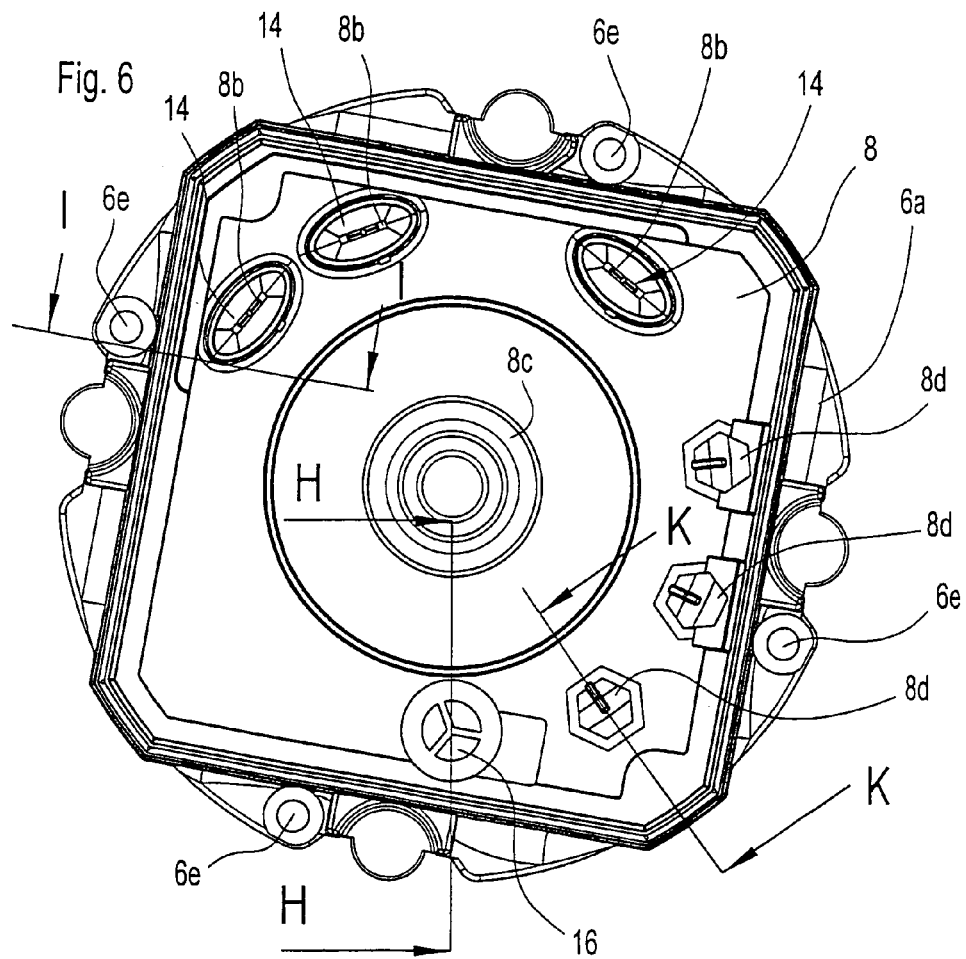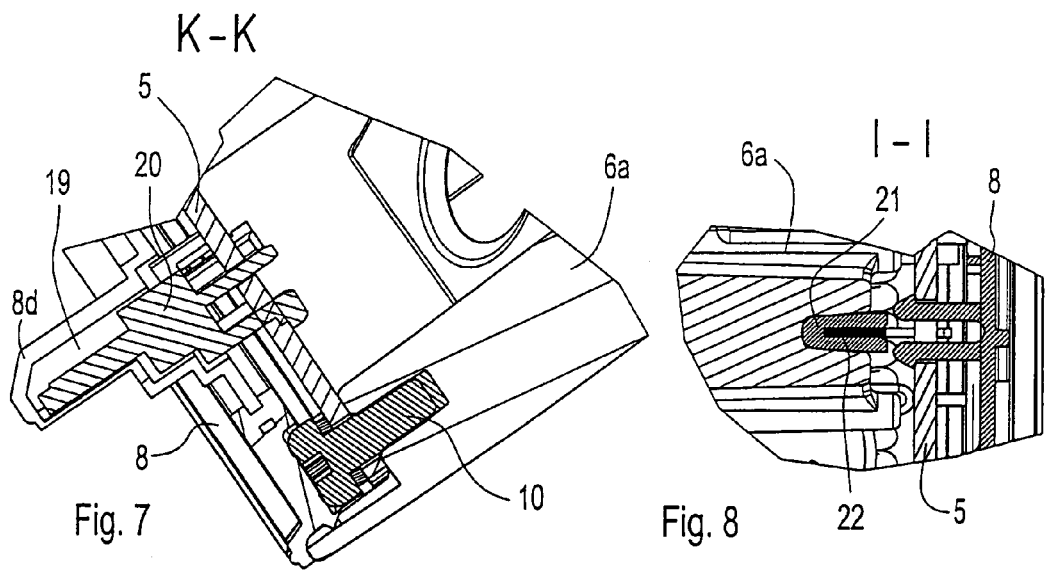

H-H

ELECTRIC MOTOR HAVING A HIGH DEGREE OF PROTECTION AGAINST THE INGRESS OF FOREIGN PARTICLES AND MOISTURE

CROSS REFERENCE TO RELATED APPLICATION

This application claims priority to German Utility Model Application Number 20 2004 010 513.6, filed Jul. 6, 2004.

FIELD OF THE INVENTION

The invention relates to an electric motor having a high degree of protection against the ingress of foreign particles and moisture. In particular the invention relates to an electronically commutated external rotor DC motor, having a stator, a rotor and having an electronics housing which extends transversely with respect to the motor shaft and accommodates in its interior a printed circuit board having open-loop and closed-loop control electronics and commutation electronics. Connection openings are located in a base of the electronics housing, connection elements, which connect the stator and the printed circuit board to one another, pass through the connection openings, and a seal is provided for sealing at least the connection openings in the base of the electronics housing through which the connection elements pass.

As regards the ingress of foreign particles and moisture for electric motors, standards, in particular the standards IEC 529 and DIN/IEC EN 60034, part 5, which are divided into different types of protection, establish a degree of protection of the electrical operating means which is expressed in the form of classes of protection. In this case, the classes of protection are indicated by a letter code and two identification numbers, of which the first describes the protection against solid foreign particles and the second describes the protection against water. For example, IP 00 (IP—"International Protection") means that there is neither protection against touching contact and protection against solid foreign particles nor protection against water. A high degree of protection is in this case achieved for electric motors in particular by parts to be sealed being cast with one another.

A similar electric motor to that described as previously described, for example, in DE 103 13 274 A1. It is stated that a degree of protection of IP 54 is ensured for this known motor. In this case, the first number 5 indicates that complete protection against touching contact and protection against deposits of dust are ensured, whereas the second number 4 represents the presence of protection against water spray from all directions.

An electric motor of the general type described previously is disclosed in EP 1 361 644 A2. This document describes an electronically commutated external rotor DC motor having a stator and a rotor which surrounds the stator and is provided with permanent magnets, a bearing supporting tube, centrical within the stator, accommodating in its interior the shaft of the rotor and, on the side remote from the rotor, merges with an electronics housing which extends transversely with respect to the motor shaft. A printed circuit board is located in the electronics housing with the open-loop and closed-loop control electronics and commutation electronics is closed with a housing lid. Connection elements, which connect the winding and a printed circuit board to one another, pass through the base of the housing, the connection elements being fixed to an end side plastic layer of the stator which insulates the end winding of the stator windings with respect to the stator laminate stack. The motor has different sealing elements; a first sealing element is arranged between the end winding and the base disk of the electronics housing and seals at least the openings in the base part of the electronics housing through which connection elements pass, and a second sealing element seals tightly the gap in the joint between the bearing faces of the housing lid and the electronics housing and is designed to accommodate electrical contacts for the purpose of connecting the motor to the supply voltage.

The present invention is based on the object of providing an electric motor of the type described previously which, as well as ensuring a high degree of protection against the ingress of foreign particles and moisture, is characterized by a simplified assembly operation.

SUMMARY OF THE INVENTION

The object is achieved according to the invention by a seal having a plate like partition wall which is arranged on the base of the electronics housing and serves the purpose, both physically sealing the electronics housing and further sealing the gaps in the electronics housing.

The inventive design of the seal and its arrangement on the base of the electronics housing advantageously allows for a lid closing the electronics housing with the partition wall to form a housing unit which is closed off, can be preassembled, can be plugged onto the base of the electronics housing and, in particular, can be screwed to said base. The assembly of the electric motor according to the invention is in this regard designed to be secure and precise and, in particular, particularly low in complexity, it being possible to dispense with integrally casting together the parts to be connected and to be sealed against environmental influences.

The base of the housing may in this case advantageously be part of a motor unit which can likewise be preassembled and in which the base is formed by a stator flange which is connected, in particular integrally, with a bearing supporting tube of the stator, and which is possibly fitted with further parts associated with the seal, for example with a hole sealing part which comes to bear against the partition wall in the assembled state, can be connected to said partition wall and engages in the connection openings in the base of the electronics housing, preferably in an interlocking and latching manner.

It is advantageously also possible for the partition wall to have troughs (plate troughs), which in each case surround the through openings for passing through the connection elements, for the purpose of accommodating a sealing compound. With such a design, a hole sealing part provided may likewise have troughs (disk troughs) for the purpose of accommodating the sealing compound, said troughs being formed in complementary fashion to the plate troughs of the partition wall such that they form, in each case with said plate troughs, an encapsulated space which is surrounded by two half shells for the purpose of accommodating the sealing compound. Instead of casting of the components together with one another, there is advantageously thus only casting of specific, encapsulated regions of the seal.

In an alternative embodiment, in place of the sealing compound, a special sealing insert part surrounding the connection elements may also be used for the hole sealing part in the encapsulated space formed by the troughs. If necessary, casting can thus be avoided completely.

BRIEF DESCRIPTION OF THE DRAWINGS

Further advantageous embodiments of the invention are contained in the subclaims and the description below. The invention will be explained in more detail with reference to two exemplary embodiments illustrated in the drawings attached, in which:

FIG. 6 shows a plan view of that side of the motor unit of the electric motor according to the invention which faces the electronics housing, FIG. 7 shows a detail as a section along the line K—K in FIG. 6, FIG. 8 shows a detail as a section along the line I—I in FIG. 6.

DETAILED DESCRIPTION OF THE INVENTION

Figure 1:
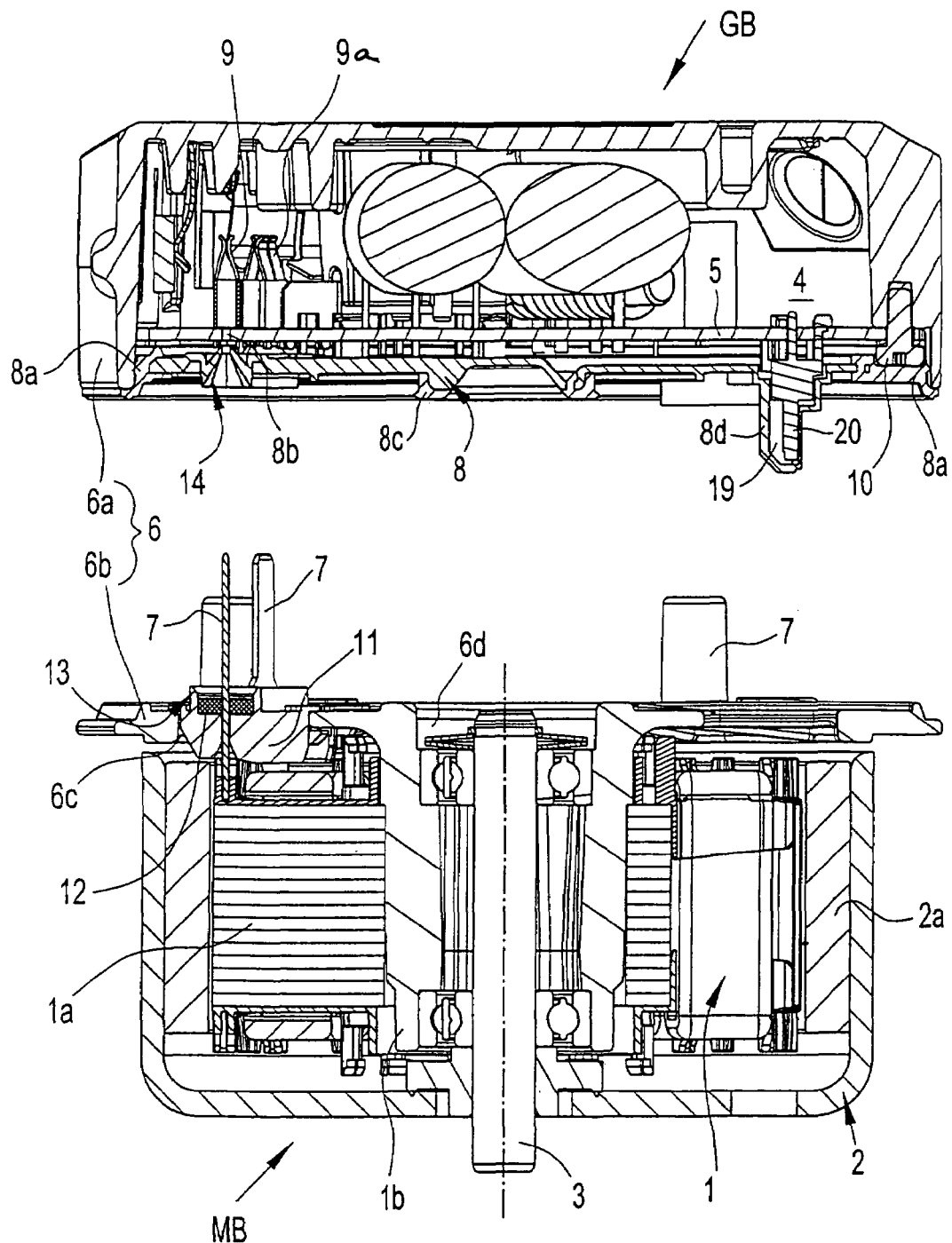
FIG. 1 shows an illustration of an axial section through an electric motor according to the invention in a first embodiment in which a housing unit, which can be plugged onto a motor unit and can be connected to said motor unit, is depicted separately from the motor unit.

The same parts in the figures of the drawing are also always provided with the same references, which means that they are generally also only described once in each case.

Figure 2:
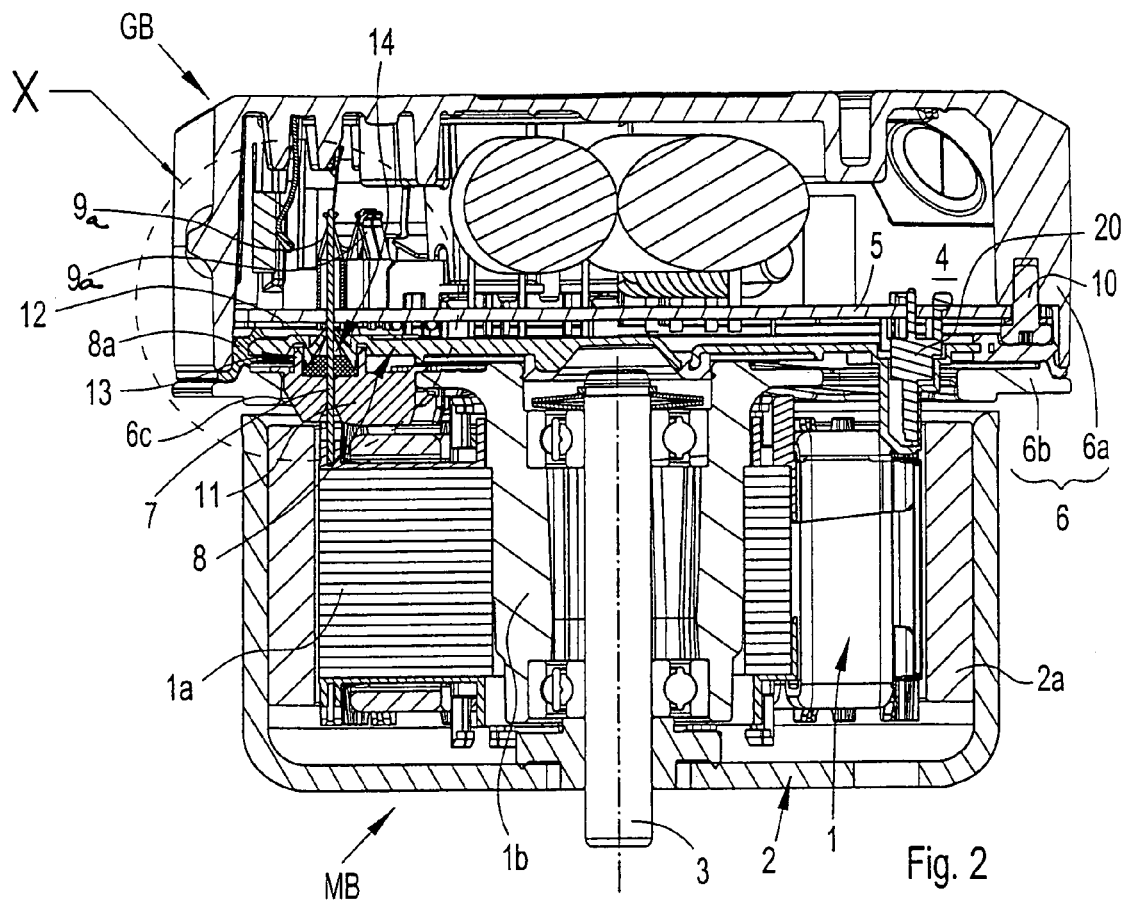
FIG. 2 shows an illustration which corresponds to that in FIG. 1 and in which the motor unit and the housing unit are shown in assembled form.

As can initially be seen in FIG. 1 and FIG. 2, an electric motor according to the invention, which is in particular an electronically commutated external rotor DC motor, comprises a stator 1, a rotor 2 and an electronics housing 6 which extends transversely with respect to the motor shaft 3, accommodates in its interior 4 a printed circuit board 5 having open-loop and closed-loop control electronics and commutation electronics and which comprises a lid 6a and a base 6b. The electronics housing 6 is arranged in particular on the side remote from the rotor 2 and both the base 6b and the lid 6a are preferably be made from metal, such as an aluminum die casting alloy, which provides a high robustness and heat conductivity.

The stator 1 is surrounded in the form of a pot by the rotor 2. The rotor 2 being formed in a known manner from a magnetic return path ring which bears permanent magnets 2a on its inner circumferential wall. In a likewise known manner, the stator 1 comprises a stator laminate stack 1a which has a stator winding wound around it and is radially opposite the magnets 2a of the rotor 2.

Connection openings 6c are located in the base 6b of the electronics housing 6, connection elements 7, which connect the stator 1 and the printed circuit board 5 to one another in the assembled state and are in the form of, in particular, flat plugs, passing through the connection openings 6c. In this case, a multi part seal, which is referred to below by means of its individual elements, seals at least the connection openings 6c in the base 6b of the electronics housing 6 through which the connection elements 7 pass. The seal makes it possible to achieve a high degree of protection against the ingress of foreign particles and moisture.

According to the invention, the seal comprises a plate like partition wall 8 which is arranged on the base 6c of the electronics housing 6 and serves the purpose, on the one hand, of physically sealing the electronics housing 6 and, on the other hand, of sealing the gaps in the electronics housing 6. The partition wall 8 has a peripheral edge sealing lip 8a for the purpose of providing a seal with respect to the lid 6a of the electronics housing 6.

As can be seen in particular in FIG. 1, the electric motor according to the invention is formed from two basic units MB and GB which are easy to separate from one another and are easy to assemble with one another. Motor unit MB comprising the stator 1 and the rotor 2 and a housing unit GB which can be plugged onto the motor unit MB and can be connected to it, in particular screwed to it.

As can be seen in the upper part of FIG. 1, the partition wall 8 associated with the housing unit GB has through openings 8b for passing through the connection elements 7 during plugging. In this case, the housing unit GB comprises, in addition to the partition wall 8, in particular the lid 6a of the electronics housing 6. The base 6b is associated with the motor unit MB, but the partition wall 8 advantageously forms a base for the housing unit GB.

The base 6b of the electronics housing 6 is formed by a stator flange which is connected, in particular integrally, with a bearing supporting tube 1b for the laminate stack 1a of the stator 1. Owing to the connection to the bearing supporting tube 1b, the base 6b of the electronics housing 6 thus has a centrically arranged aperture 6d for the purpose of accommodating the shaft 3 of the motor. The shaft 3 itself is connected to the stator 1 in the bearing supporting tube 1b via bearing elements which are arranged at a spacing from one another and which are not described in more detail. For the purpose of sealing the edge of the aperture 6d or the tube opening of the bearing supporting tube 1b, a shaft seal 8c is arranged on the partition wall 8 (as can be seen in particular in the upper part of FIG. 1).

Electronic components (not described in any more detail) are fixed to the printed circuit board 5 in the interior 4 of the housing unit GB. In this case, the printed circuit board 5 may be fitted with components on both sides, smaller components being fixed on that side of the printed circuit board 5 which faces the partition wall 8. For this purpose, a corresponding spacing 9 (FIG. 3) is provided between the printed circuit board 5 and the partition wall. The printed circuit board 5 is fixed, on the one hand, by means of screws 10, for example, which are screwed into the lid 6a of the electronics housing 6 and are then covered by the partition wall 8, and, on the other hand, by means of the electrical connection elements 7 which pass through the partition wall 8 and the base 6b of the electronics housing 6 at several points in order to connect the stator winding to electrical contacts 9a, in particular contact tongues, of the printed circuit board 5. The connection elements 7 are in this case are inserted in openings in a stator laminate stack, which has plastic injection molded around it on the end side; namely, that side which faces away from the rotor 2 and protrude axially therefrom, as illustrated in the lower part of FIG. 1 and in FIGS. 2 and 3. The connection elements 7 may in this case have lateral protrusions tight on the stator region, the ends of the stator winding being fixed to such protrusions by means of press welding, for example.

Figure 3:
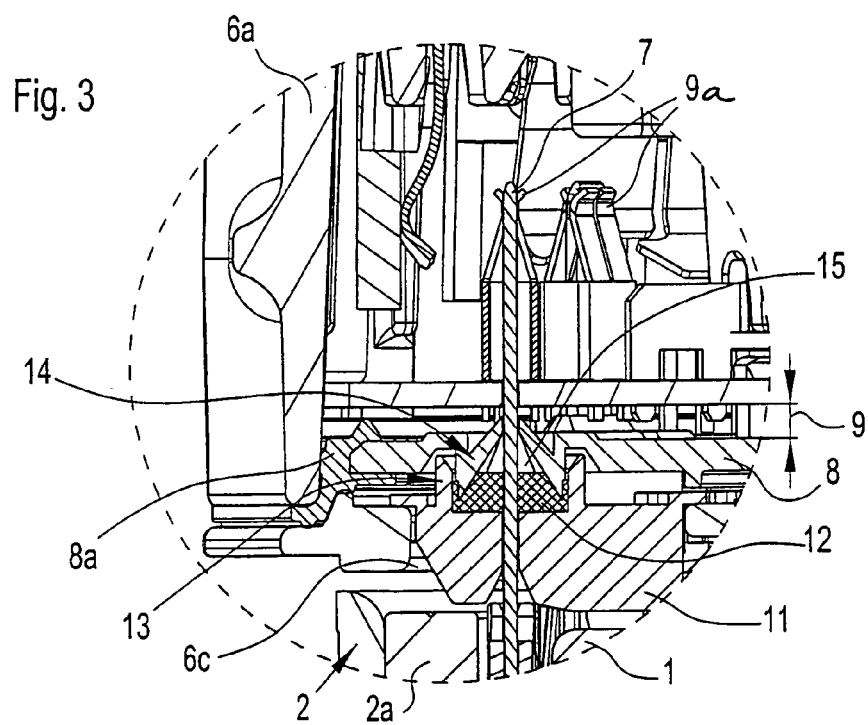
FIG. 3 shows a detail denoted X in FIG. 2.

The lower part in FIG. 1 and FIG. 2 and the enlarged illustration in FIG. 3 also illustrate the fact that the seal, in addition to the partition wall 8, also comprises a disk like hole sealing part 11 which comes to bear against the partition wall 8 and which, on the one hand, engages in the connection openings 6c in the base 6b of the electronics housing 6, preferably in an interlocking manner and in the process in particular in a latching manner, and, on the other hand, can be connected to the partition wall 8. In this case, the connection takes place in accordance with the first embodiment of the invention (as is described in detail below), in particular in a manner using techniques such as soldering, bonding or welding, using an adhesive compound or a casting compound as the sealing compound 12. The hole sealing part 11 may advantageously be made in particular from a thermoplastic hard material, for example glass fiber reinforced polyamide.

Figure 4:
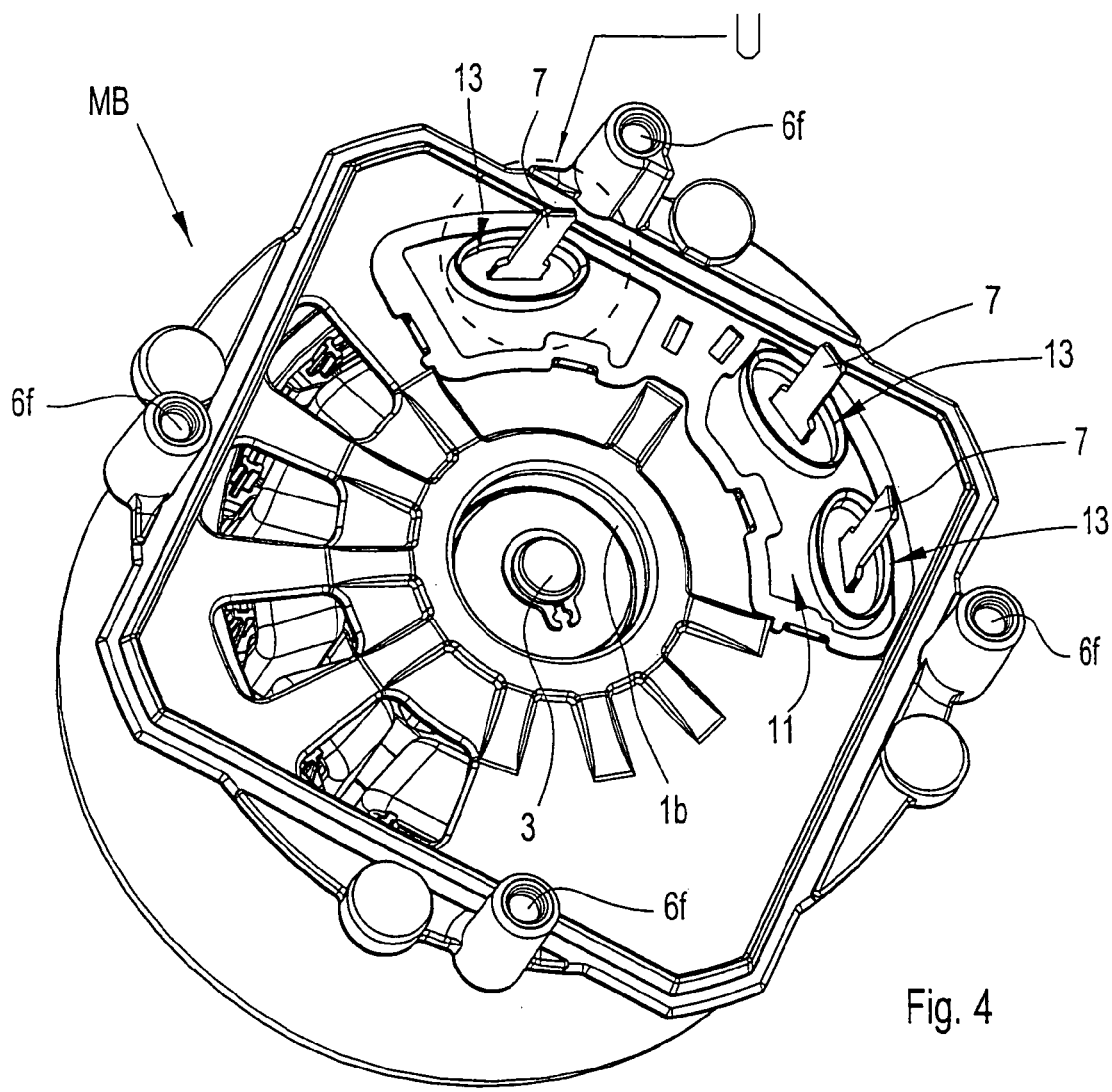
FIG. 4 shows a perspective plan view of a base of the electronics housing of the electric motor according to the invention.
Figure 5:
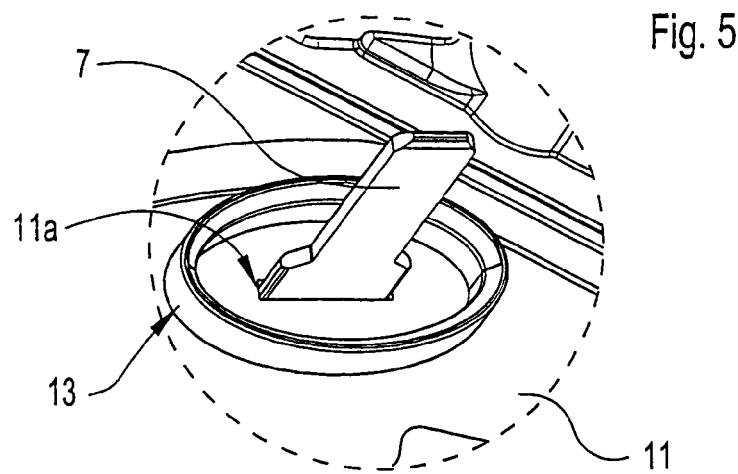
FIG. 5 shows a detail denoted U in FIG. 4.

As can initially be seen from the lower part in FIG. 1, the hole sealing part 11 has troughs (referred to below as disk troughs 13) for the purpose of accommodating the sealing compound 12, which may be, in particular, a thixotropic liquid in the processing state. More detailed illustrations of the disk troughs 13 are shown in FIGS. 4 and 5. In order to assemble it with the housing unit GB, the hole sealing part 11 with the disk troughs 13 is initially pushed onto the connection elements 7. In the region of the disk troughs 13, the hole sealing part 11 has slot like through openings 11a (only shown in FIG. 5) for passing through the connection elements 7 which are in the form of, in particular, flat blades. The disk troughs 13 may in this case have, in particular, an elliptical shape in plan view in each case so as to match the slot like through openings 11a, as illustrated.

In order to avoid the formation of rips in the hole sealing part 11 in the region of the through openings 11a when the connection elements 7 are inserted, the connection elements 7 may have a different width. In this case, when the parts are assembled, initially a narrower region passes through the through openings 11a, followed by a wider foot region. The first region may merely be stamped and may possibly also have slightly sharp edged corners, whereas the slightly broader foot region should preferably be round at its edges, as a result of which possible damage to the hole sealing part 11 by means of the formation of rips is prevented.

Even the partition wall 8 may have troughs (referred to below as plate troughs 14), which in each case surround its through openings 8b for passing through the connection elements 7, for the purpose of accommodating the sealing compound 12. These plate troughs 14 can be seen in the upper part of FIG. 1, in FIG. 2, more clearly in FIG. 3 and also in FIGS. 6 and 11. Just as the disk troughs 13, the plate troughs 14 may be designed to be elliptical in plan view, in each case so as to be matched to a slot like shape of the through openings 8b.

In this case, the plate troughs 14 may in each case be formed in complementary fashion to the disk troughs 13 such that they form, in each case with the disk troughs 13, an encapsulated space (denoted with the reference 15 only in FIG. 3) which is surrounded by two half shells. The troughs 13, 14 may advantageously be designed in particular such that a tongue and groove system is produced during assembly. The connection elements 7 and the disk trough 13 together form the groove, and the opposing piece in the partition plate 8 forms the tongue. This opposing piece displaces the compound which has been fed in and thus ensures that all of the relevant components are covered completely. For this purpose, the plate troughs 14 (in contrast to the disk troughs 13) may in each case be in the form of funnels over their height. To such an extent, the necessary gaps in the joint are in this case selected such that the smallest gap is produced when the plug is passed through. This initially brings about pressing of the compound against the flat plug (connection element 7) and then the emergence of the excess sealing compound 12 at the gap in the joint between the disk trough 13 and the partition wall 8.

This type of connection between the hole sealing part 11 and the partition wall 8 entails the following advantages: owing to the large volume which can be compressed, a lack of sensitivity with respect to component tolerances and a lack of sensitivity with respect to changes to the connection element 7, which is often in the form of a stamped, bent part and is therefore provided with a burr, which avoids the risk of a cut being formed which could lead to the rubber parts being damaged when they are assembled. Immediate further assembly is also possible since the curing process of the sealing compound 12 can take place in the encapsulated space 15, i.e. in the assembled state and irrespective of the position. Furthermore, force free sealing of the electronics housing 6 takes place, it also being possible for the disk trough 13 to take on the function of positioning the plug and for the connection elements 7 to be electrically insulated with respect to the stator 1.

Figure 9:
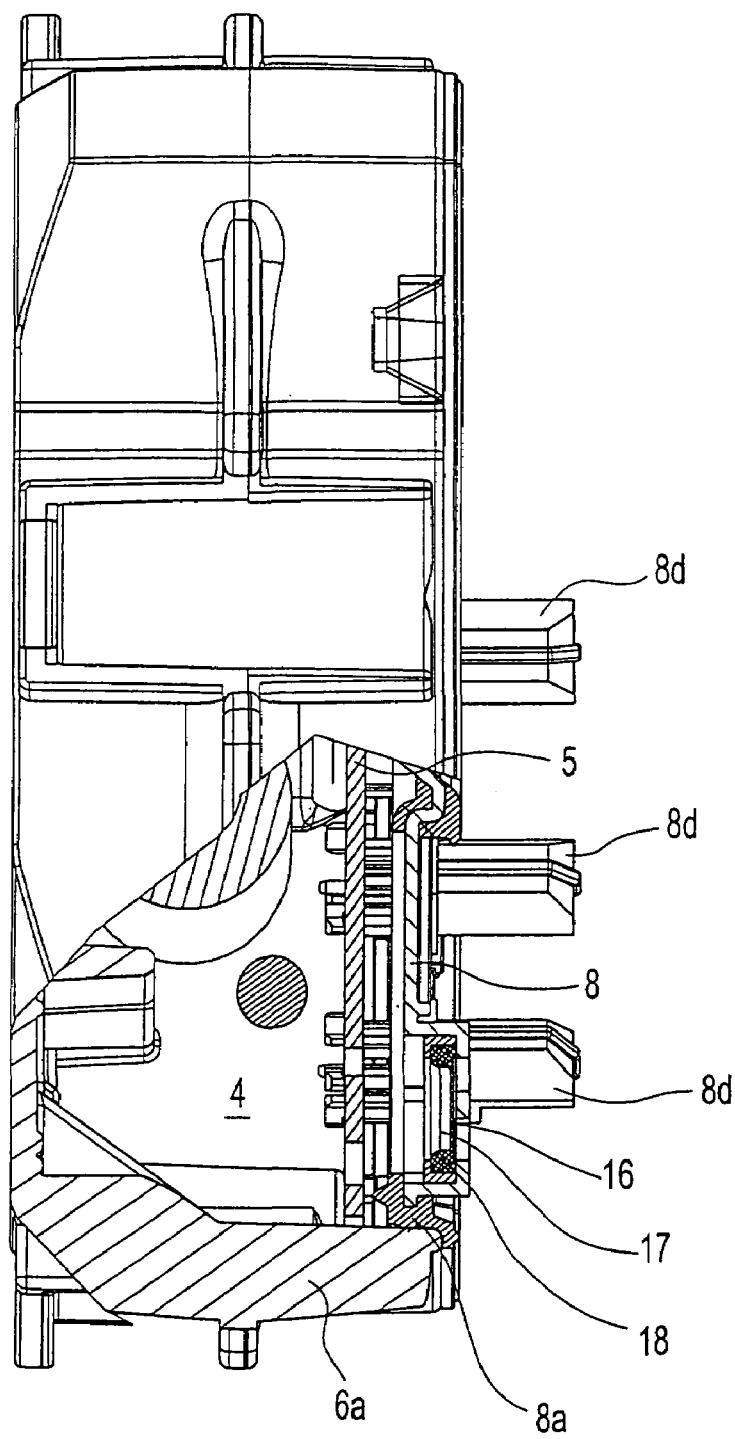
FIG. 9 shows a detail as a section along the line H—H in FIG. 6.

FIGS. 6 to 9 illustrate further possible advantageous details of an electric motor according to the invention. For example, FIG. 6 and also the section in FIG. 9 show the fact that the partition wall 8 has a pressure compensation opening 17 which is closed by a liquid tight and gas permeable membrane 16 and is preferably surrounded by a peripheral membrane sealing lip 18.

FIGS. 4 and 6 also show screw openings 6e, 6f, which have not been mentioned up until now, on the housing lid 6a and on the housing base 6b for the purpose of mutually connecting the parts.

Provision may also be made for the partition wall 8 to have pocket like cavities 19, which are formed in dome like attachments 8d for the purpose of accommodating sensors 20, such as Hall circuits for the purpose of detecting the position and angle of rotation of the motor 3. This is illustrated in particular in FIG. 7.

FIG. 8 shows the fact that the printed circuit board 5 which has been fitted with the open loop control electronics can be connected to the in particular metallic lid 6a of the electronics housing 6 via a particularly thermally conductive part 21, such as a so called gap pad. In this case, the thermally conductive part 21 may be present in folded form (as illustrated) and surround a resistance strip 22 with which contact is made on the printed circuit board, and the thermally conductive part 21 thereby cools the resistance strip 22.

Figure 10:
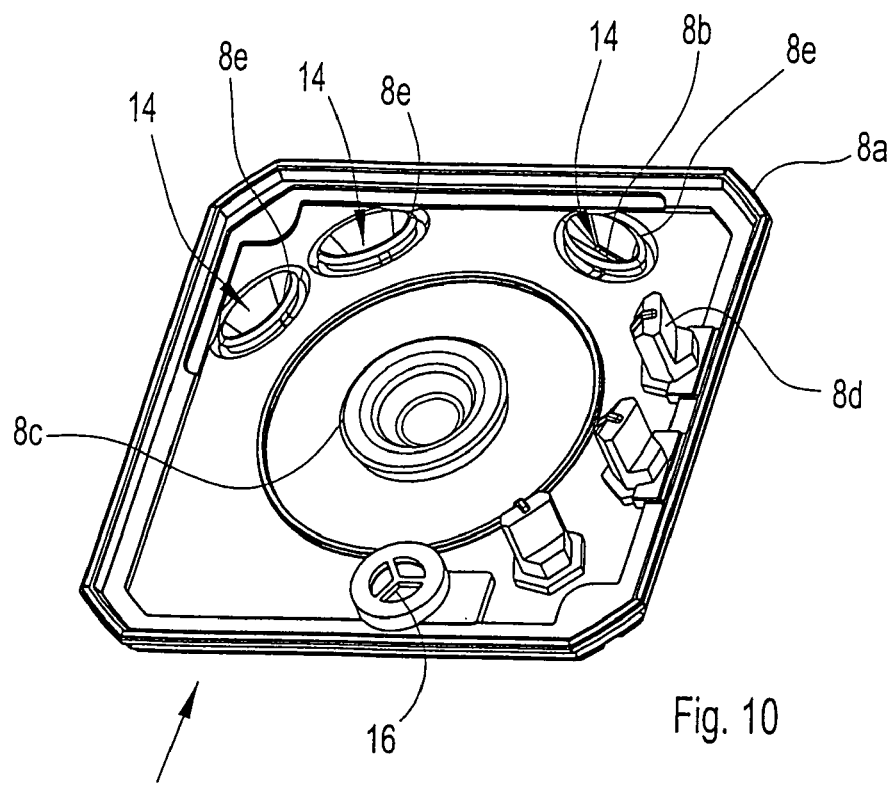
FIG. 10 shows a perspective plan view of a side, which faces the base of the electronics housing, of a preferred embodiment of a partition wall of the electric motor according to the invention.
Figure 11:
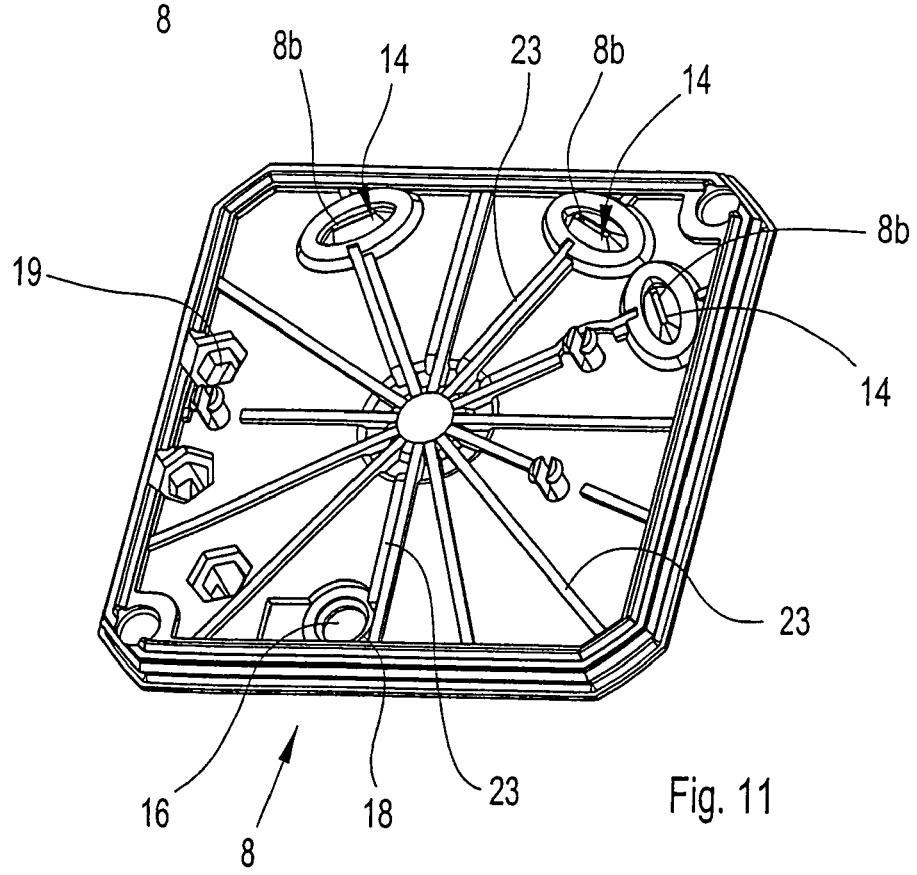
FIG. 11 shows a perspective plan view of a side, which faces the lid of the electronics housing, of a preferred embodiment of a partition wall of the electric motor according to the invention.

As has already been mentioned, FIGS. 10 and 11 show two different perspective views of the embodiment, which has previously been described as being preferred, of the partition wall 8 of the electric motor according to the invention. In this case, FIG. 10 shows an advantageous detail which has not previously been mentioned and which is not sufficiently visible in the other figures, namely that the partition wall 8 may, in a preferred embodiment, have element sealing lips 8e which run around the edge of the through openings 14 for the purpose of sealing the through openings 8b in the region of the plate troughs 14.

The two FIGS. (10 and 11) also show another technically advantageous detail of the invention, to be precise one in which the partition wall 8 with the edge sealing lip 8a, the element sealing lips 8e, the membrane 16, the membrane sealing lip 18 and/or the shaft seal 8c may be in the form of a two component plastic part which is preferably produced in a two stage injection molding process or die casting process, it being possible for the partition wall 8 to be made from a thermoplastic hard component, such as a polyolefin, for example glass fiber reinforced polyamide, and the sealing lips 8a, 8e, 18, the liquid tight and gas permeable membrane 16 of the pressure compensation opening and/or the shaft seal 8c to be made from an elastomeric and/or thermoplastic soft component, such as a thermoplastic elastomer. The perspective plan view illustrated in FIG. 11 of that side of the partition wall 8 which faces the lid 6a of the electronics housing 6 in the installed state in this case shows webs 23 of the soft component which may remain on the partition wall 8 after casting.

Figure 12:
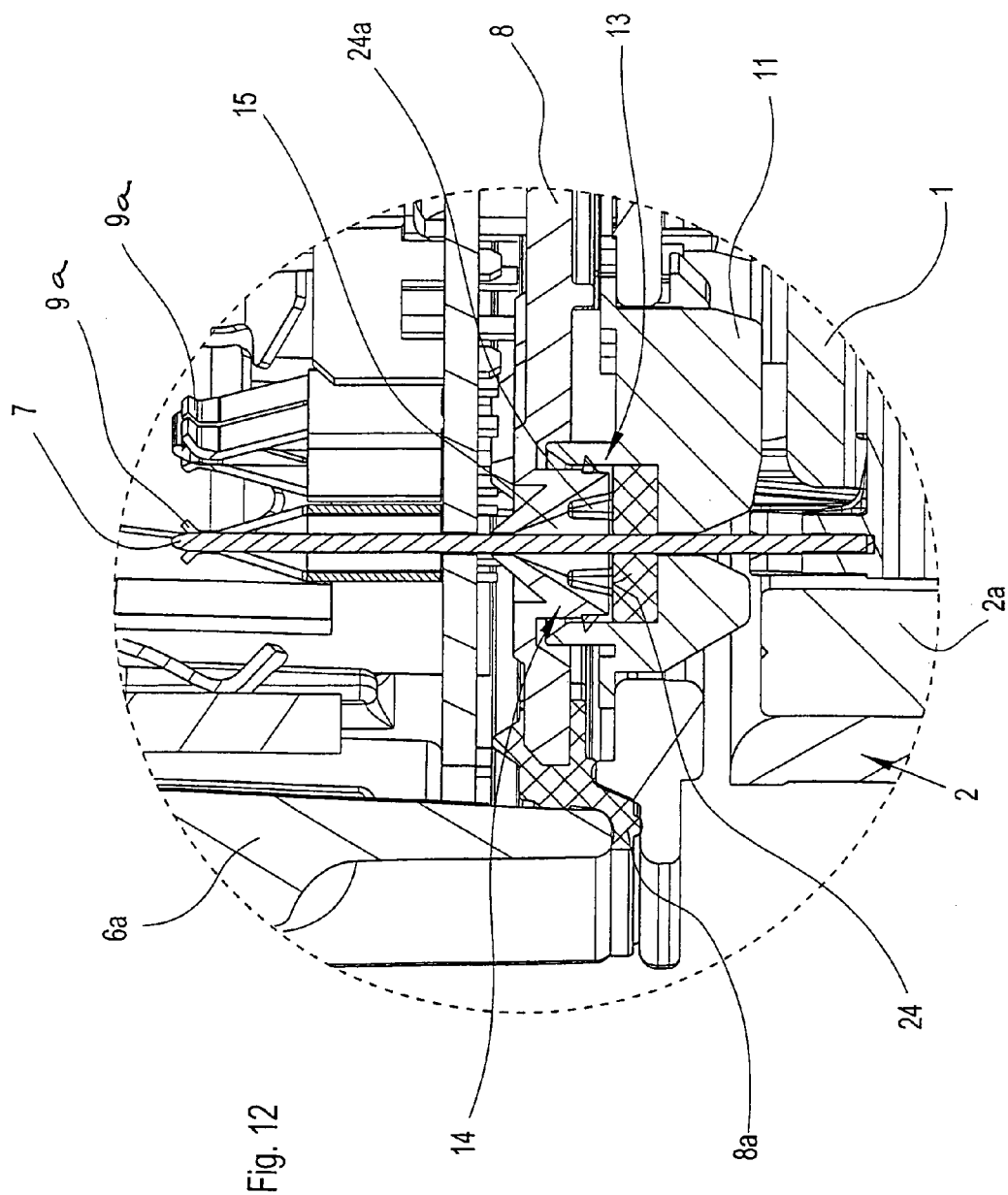
FIG. 12 shows the detail denoted X in FIG. 2, but as an alternative embodiment.

The second, alternative embodiment of an electric motor according to an invention which is illustrated in FIG. 12 and has already been mentioned in the description to the figures differs from the first embodiment in that a separate sealing insert part 24, which surrounds the connection elements 7 and is preferably elastomeric, for example is made from silicone rubber, rests on the bases of the disk troughs 13 of the hole sealing part 11 instead of the sealing compound 12. The sealing insert part 24 is matched in its plan view to the plan view of the troughs 13, 14 in an interlocking manner and has knob like projections 24a on its upper side and underside which can interact in the manner of a compression spring with the funnel like walls of the plate troughs 14 and can thus lead to it being anchored in the troughs 13, 14. Anchoring in the additionally introduced sealing compound 12 is also conceivable. Owing to the section plane selected in FIG. 12, only the upper side of the sealing insert part 24 can be seen.

Figure 13:
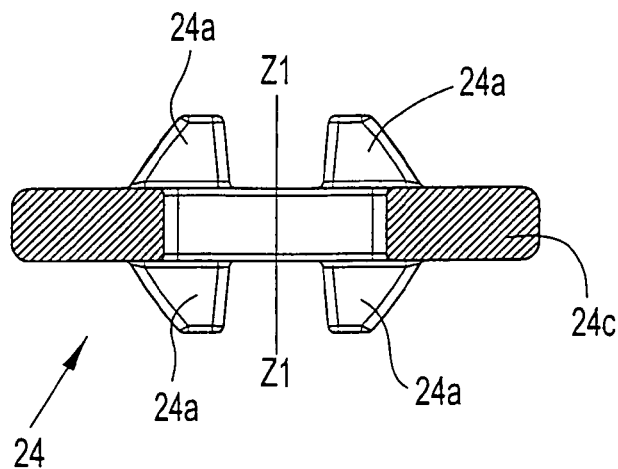
FIGS. 13 to 15 show various views of a sealing insert part of the electric motor according to the invention which is used in the alternative embodiment shown in FIG. 10.
Figure 14:
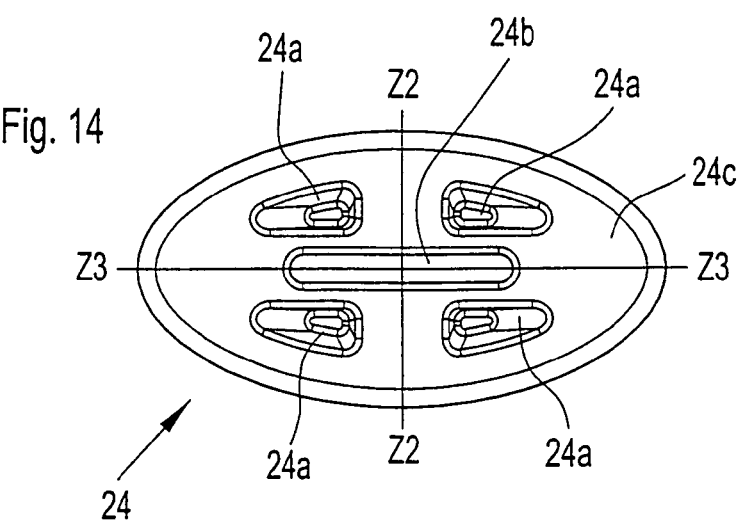
Figure 15:
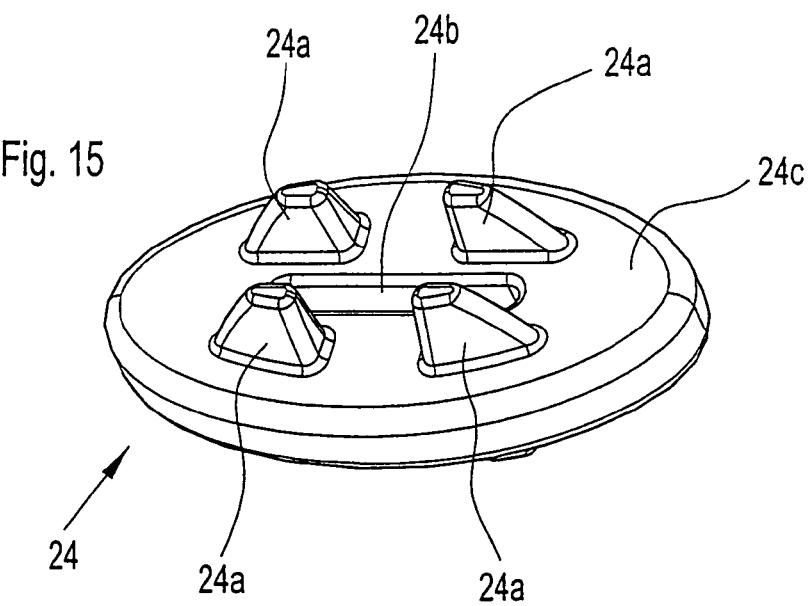

FIGS. 13, 14 and 15 show a longitudinal section, a plan view and a perspective view of the sealing insert part 24 illustrated in FIG. 12, in the case of which, in each case on both sides of a longitudinal slot 24b in the basic body 24c—in total eight knob like projections 24a which are equal in size are provided both on the upper side and on the underside. This results in a symmetry which makes assembly of the part easier, since said part can be rotated through 180° in each case about the three spatial axes Z1 Z1, Z2 Z2, Z3 Z3 shown in FIGS. 13 and 14, but can nevertheless be placed in the correct position in the troughs 13, 14.

So as to match the funnel shape of the plate troughs 14, the projections may have, in particular, essentially the shape of an inclined, truncated cone (as shown). In the embodiment of the sealing insert part 24 shown in FIGS. 13 to 15, it is in this case advantageous if the disk troughs 13 of the hole sealing part 11 have a trough base with an aperture which can be closed by means of the sealing insert part 24.

As has already been described in the embodiments above, the present invention is not restricted to the exemplary embodiments illustrated, but comprises all of the means and measures having the same effect in the sense of the invention. For example, in the case of a pin-like arrangement, the shape of the connection elements 7 and, associated therewith, the shape of the through-openings 8b, 11b in the partition wall 8 or in the hole sealing part 11 and possibly that of the longitudinal slot 24b in the sealing insert part 24 and the shape of the troughs 13, 14 could differ from the shapes illustrated.

In addition, it need not necessarily be (as illustrated) an electronically commutated external rotor DC motor, but another electric motor, which has the non-facultative features of claim 1 in that it contains, for example, in the electronics housing 6 exclusively components which are not used for commutation purposes, also falls within the context of the invention.

In addition, the invention is not restricted to the combination of features defined in claim 1, but may also be defined by any other desired combination of specific features of all of the individual features disclosed overall. This means that in principle virtually any individual feature in claim 1 can be omitted and can be replaced by at least one individual feature which is disclosed at another point in the application. To this extent, the wording of the claims is merely to be understood as a first version of the wording for the invention.

While the above description constitutes the preferred embodiment of the present invention, it will be appreciated that the invention is susceptible to modification, variation and change without departing from the proper scope and fair meaning of the accompanying claims.

The invention claimed is:

1. An electric motor having a high degree of protection against the ingress of foreign particles and moisture, comprising; a stator, a rotor, an electronics housing which extends transversely with respect to a motor shaft and accommodates in its interior, a printed circuit board having electronic elements, connection openings being located in a base of the electronics housing, connection elements, which connect the stator and the printed circuit board to one another, passing through the connection openings, and a seal sealing at least the connection openings in the base of the electronics housing through which the connection elements pass, the seal in the form of a plate-like partition wall which is arranged on the base of the electronics housing and physically seals the electronics housing and further seals gaps in the electronics housing.

2. The motor as claimed in claim 1, wherein the partition wall has a peripheral edge sealing lip for providing sealing with respect to a lid of the electronics housing.

3. The motor as claimed in claim 2, wherein the partition wall has through openings for passing through the connection elements.

4. The motor as claimed in claim 3, wherein the partition wall has element sealing lips which run around the edge of the through openings for the purpose of sealing the through openings.

5. The motor as claimed in claim 1, wherein the partition wall has a pressure compensation opening which is closed by a flexible membrane, and surrounded by a peripheral membrane sealing lip.

6. The motor as claimed in claim 1, wherein the base of the electronics housing has a centrically arranged aperture for the purpose of accommodating the motor shaft, and a shaft seal is arranged on the partition wall for the purpose of sealing the edge of the aperture.

7. The motor as claimed in claim 2, wherein the partition wall with the edge sealing lip is in the form of a two component plastic part, the partition wall being made from a thermoplastic hard component being made from an elastomeric soft component.

8. The motor as claimed in claim 3, wherein the partition wall has plate troughs, which in each case surround the through openings for passing through the connection elements, for the purpose of accommodating a sealing compound.

9. The motor as claimed in claim 8, wherein the plate troughs are elliptical in plan view and matched to a slot like shape of the through openings for passing through the connection elements which are in the form of flat blades.

10. The motor as claimed in claim 8, wherein the plate troughs are in the form of funnels over their height.

11. The motor as claimed in claim 1, wherein the partition wall has pocket like cavities, which are formed in dome like attachments, for the purpose of accommodating sensors, for the purpose of detecting the position of the motor shaft.

12. The motor as claimed in claim 1, wherein the seal comprises a disk like hole sealing part which comes to bear against the plate-like partition wall and which engages in the connection openings in the base of the electronics housing in an interlocking manner, and can be connected to the partition wall.

13. The motor as claimed in claim 12, wherein the hole sealing part is made from a thermoplastic hard material.

14. The motor as claimed in claim 12, wherein the hole sealing part has disk troughs for the purpose of accommodating a sealing compound, the disk troughs in each case being formed in complementary fashion to the plate troughs of the partition wall such that they form, in each case with the plate troughs, an encapsulated space which is surrounded by two half shells.

15. The motor as claimed in claim 14, wherein the disk troughs of the hole sealing part have a trough base, having an aperture and can be covered by a separate sealing insert part which surrounds the connection elements and is formed of an elastomeric material.

16. The motor as claimed in claim 15, wherein the sealing insert part forms knob-like projections for the purpose of anchoring it in the trough base.

17. The motor as claimed in claim 2, wherein the electronics housing base and the lid are made from metal.

18. The motor as claimed in claim 2, wherein the lid of the electronics housing with the partition wall forms a housing unit which is closed off and can be plugged onto a motor unit, which comprises the base of the electronics housing.

19. The motor as claimed in claim 1, wherein the base of the electronics housing is formed by a stator flange which is connected, in particular integrally, with a bearing supporting tube of the stator for its laminate stack.

* * * * *

UNITED STATES PATENT AND TRADEMARK OFFICE
CERTIFICATE OF CORRECTION

| | |
|---|---|
| PATENT NO. | : 7,211,914 B2 |
| APPLICATION NO. | : 11/175866 |
| DATED | : May 1, 2007 |
| INVENTOR(S) | : Walter Hofmann, Gunter Streng and Jochen Schwarz |

It is certified that error appears in the above-identified patent and that said Letters Patent is hereby corrected as shown below:

On the Title page, under Foreign Application Priority Data, please delete "20 2004 010 513U" and insert --20 2004 010 513.6--.

Signed and Sealed this

Tenth Day of July, 2007

JON W. DUDAS
*Director of the United States Patent and Trademark Office*